(No Model.)
G. W. IMMEL.
DRAIN CLEANER.
No. 300,870. Patented June 24, 1884.
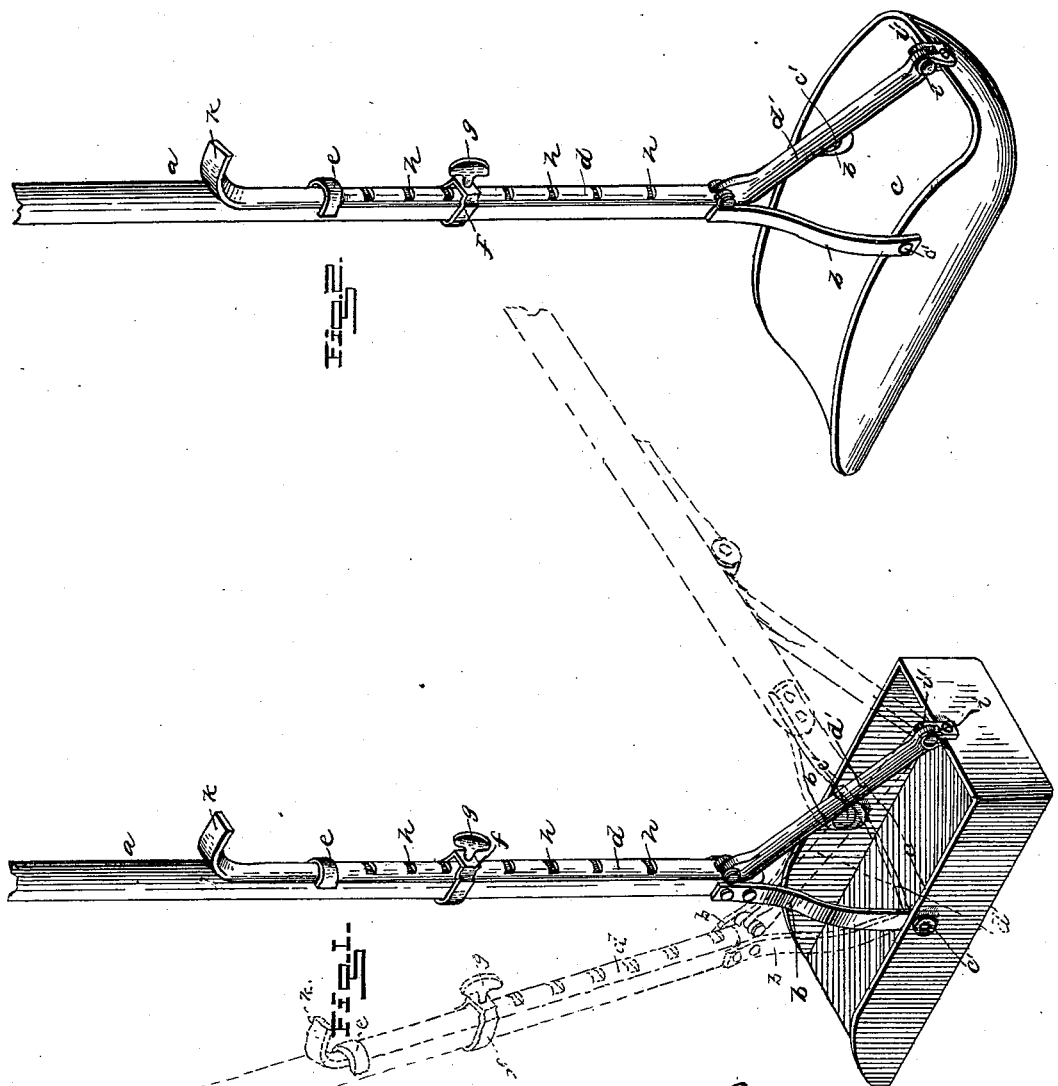
WITNESSES
F. L. Ourand
E. G. Siggers
Geo. W. Immel
INVENTOR
by C. A. Snow & Co.
Attorneys

UNITED STATES PATENT OFFICE.

GEORGE WASHINGTON IMMEL, OF LOGANSPORT, INDIANA.

DRAIN-CLEANER.

SPECIFICATION forming part of Letters Patent No. 300,870, dated June 24, 1884.

Application filed March 14, 1884. (No model.)

*To all whom it may concern:*

Be it known that I, GEORGE W. IMMEL, a citizen of the United States, residing at Logansport, in the county of Cass and State of Indiana, have invented a new and useful Drain-Cleaner, of which the following is a specification, reference being had to the accompanying drawings.

This invention has relation to scoops or scrapers intended to be operated by hand for cleaning the dirt, &c., from drains or ditches; and it consists in the construction and novel arrangement of parts, as will be hereinafter fully described, and particularly pointed out in the claim.

Figure 1 of the drawings is a view of a drain-cleaner embodying the improvements of my invention, showing one form of scoop or dirt-pan attached, the dotted lines showing two adjustments of the parts; and Fig. 2 is a similar view with an open-end scoop or pan attached to the handle and to the hinged adjusting-rod.

Referring by letter to the drawings, $a$ designates the handle of the cleaner, which is of wood, made light and strong enough for the uses to which it is to be put. To the lower end of the handle diverging straps $b\,b$, of metal, are bolted on opposite sides, and extend downwardly a suitable distance, and to the lower ends of these straps $b\,b$ the edges of the dirt-pan or scoop $c$ are pivoted by rivets $c'$, passed through eyes $c^2$ in the lower ends of the straps $b\,b$, and through holes in the edges of the pan $c$ about midway of their length, as shown. To the rear side of the handle $a$ a notched adjusting-rod, $d$, having a hinged arm, $d'$, at its lower end, is secured, so as to be adjustable therein by a clip-guide, $e$, secured to the handle by screws or bolts, and a spring-clasp, $f$, encircling both the handle and notched portion $d$ of the adjusting-rod, and provided with a set-screw, $g$, which is designed to be turned up to engage either one of the series of notches $h$ of the notched rod to hold the latter to its adjustment. The lower end of the hinged arm $d'$ is pivoted through an eye, $i$, to lugs $i'$ on the rear edge of the dirt-pan $c$, so that by adjusting the rod $d$, which is provided at its upper end with a finger-piece, $k$, for the purpose, the pan may be set at an angle that it may either be pushed or pulled—for instance, in a sewer—by the handle, and may also be set at numerous intermediate angles between the pushing and pulling positions wherein the handle is nearest a horizontal plane. The set-screw must be loosened to permit the rod to be moved and tightened again when the desired adjustment has been made. I may use either of the forms of scoop shown—viz., the flat-bottom scoop with the vertical sides and vertical rear ends, or the pressed dirt-pan or scoop without the vertical sides and ends—or other forms that may be hinged to the handle and the hinged arm of the adjusting-rod.

This device is simple, cheap, and durable, may be conveniently used for the purposes for which it is intended, and is not likely to get out of order. The pans may vary in size and, being removably connected to the hangers, can be changed at pleasure.

I am aware that a ditch-cleaner having a handle provided with a forked bar has been used in connection with a pan, a forked rod and collar having an eye, and a device for securing said collar at various points along said handle, and also that a ditching-hoe having connected thereto a bifurcated shank formed in sections the upper or free ends thereof terminating in clamps and formed with mortises, and one of said clamps having a ratchet-face has been used in connection with a handle having a head cast with tenons extending from its sides, and a ratchet-face to engage with that on the clamp, said mortises and tenons being a pivotal center, and a bolt passed through said clamps and head, and I therefore claim neither of these constructions herein.

Having thus fully described my invention, what I claim as new, and desire to secure by Letters Patent of the United States, is—

In a drain-cleaner, the combination, with the handle having diverging metal straps at its lower end with eyes in their lower ends, the clip-guide, and the spring-clasp with the set-screw, of the dirt-pan having vertical sides and rear end hinged to the metal straps at its sides, and the adjusting-rod having its hinged arm connected at its lower end to the rear end of the pan by a pivot-connection, substantially as specified.

In testimony that I claim the foregoing as my own I have hereto affixed my signature in presence of two witnesses.

GEORGE WASHINGTON IMMEL.

Witnesses:
SETH M. VELSEY,
GEO. J. GROVES.